US006969936B2

(12) United States Patent
Suzuki et al.

(10) Patent No.: US 6,969,936 B2
(45) Date of Patent: Nov. 29, 2005

(54) ROTATIONAL POSITION DETECTING SENSOR-EQUIPPED MOTOR AND BIAXIAL MOTOR

(75) Inventors: Nobuji Suzuki, Saitama (JP); Hideyuki Ishii, Nagano (JP); Hidetoshi Hayashi, Nagano (JP); Sakae Kishi, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 385 days.

(21) Appl. No.: 10/034,247

(22) Filed: Dec. 27, 2001

(65) Prior Publication Data

US 2002/0053842 A1 May 9, 2002

(51) Int. Cl.[7] .............................................. H02K 17/00
(52) U.S. Cl. ....................................... 310/112; 310/114
(58) Field of Search ....................... 310/112, 114, 68 B

(56) References Cited

U.S. PATENT DOCUMENTS 5,914,548 A * 6/1999 Watanabe et al. ............. 310/88

FOREIGN PATENT DOCUMENTS

| | | | | |
|---|---|---|---|---|
| JP | 144769/1985 | | 9/1985 | |
| JP | 9362/1994 | | 2/1994 | |
| JP | 10-128692 | | 5/1998 | |
| JP | 10128692 | * | 5/1998 | ............ B25J 19/00 |
| JP | 10-257728 | | 9/1998 | |
| JP | 10-304631 | | 11/1998 | |

* cited by examiner

*Primary Examiner*—Dang Le
*Assistant Examiner*—Heba Elkassabgi
(74) *Attorney, Agent, or Firm*—Rankin, Hill, Porter & Clark LLP

(57) ABSTRACT

A rotational position detecting sensor-equipped motor is capable of reducing a dimension thereof in an axial direction thereof. The motor includes a motor section including a motor stator and a motor rotor, a revolving shaft to which the motor rotor is coupled, a bearing structure for rotatably supporting the revolving shaft, and a rotational position detecting sensor for detecting a rotational position of the revolving shaft. The bearing structure, revolving shaft, motor section and rotational position detecting sensor are arranged so as to be concentric with each other in a radial direction of the revolving shaft.

5 Claims, 2 Drawing Sheets

ROTATIONAL POSITION DETECTING SENSOR-EQUIPPED MOTOR AND BIAXIAL MOTOR

BACKGROUND OF THE INVENTION

This invention relates to a rotational position detecting sensor-equipped motor or a motor equipped with a rotational position detecting sensor for detecting a rotational position of a revolving shaft, and more particularly to a rotational position detecting sensor-equipped motor and a biaxial motor including two such rotational position detecting sensor-equipped motors and adapted to take out an output thereof from two revolving shafts.

A rotational position detecting sensor-equipped motor which is equipped with a rotational position detecting sensor such as a resolver, an encoder or the like to detect a rotational position of a revolving shaft of the motor has been commonly put into practice in the art. Such a conventional rotational position detecting sensor-equipped motor is generally constructed so that a motor section and a rotational position detecting sensor are arranged in an axial direction of a revolving shaft. Such construction of the conventional rotational position detecting sensor-equipped motor causes a reduction in dimension of the motor in an axial direction thereof to be restricted.

Also, a biaxial motor has been conventionally put into practice, which is constituted by combining two such rotational position detecting sensor-equipped motors with each other and adapted to take out a rotational output through two revolving shafts. However, the above-described construction of the rotational position detecting sensor-equipped motor likewise causes a reduction in dimension of the biaxial motor in an axial direction thereof to be limited.

SUMMARY OF THE INVENTION

The present invention has been made in view of the foregoing disadvantage of the prior art.

Accordingly, it is an object of the present invention to provide a rotational speed detecting sensor-equipped motor which is capable of permitting a reduction in dimension thereof in an axial direction thereof.

It is another object of the present invention to provide a rotational speed detecting sensor-equipped motor which is capable of obtaining significantly increased torque.

It is still another object of the present invention to provide a rotational speed detecting sensor-equipped motor which is capable of reducing the number of parts therefor.

It is yet another object of the present invention to provide a rotational speed detecting sensor-equipped motor which is capable of taking out a rotational output outwardly in a radial direction of a revolving shaft thereof.

It is even another object of the present invention to provide a rotational speed detecting sensor-equipped motor which is capable of facilitating connection of a load thereto.

It is a further object of the present invention to provide a biaxial motor which is capable of permitting a reduction in dimension thereof in an axial direction thereof.

It is a still further object of the present invention to provide a biaxial motor which is capable of obtaining significantly increased torque.

It is a yet further object of the present invention to provide a biaxial motor which is capable of reducing the number of parts therefor.

It is an even further object of the present invention to provide a biaxial motor which is capable of taking out a rotational output outwardly in a radial direction of a revolving shaft thereof.

It is another object of the present invention to provide a biaxial motor which is capable of facilitating connection of a load thereto.

In accordance with one aspect of the present invention, a rotational position detecting sensor-equipped motor is provided, which includes a motor section including a motor stator and a motor rotor, a revolving shaft to which the motor rotor is coupled, a bearing structure for rotatably supporting the revolving shaft, and a rotational position detecting sensor for detecting a rotational position of the revolving shaft. Also, in accordance with another aspect of the present invention, a biaxial motor including two such rotational position detecting sensor-equipped motors is provided.

In the rotational position detecting sensor-equipped motor of the present invention, the bearing structure, revolving shaft, motor section and rotational position detecting sensor are arranged so as to be concentric with each other in a radial direction of the revolving shaft. Such arrangement permits a dimension thereof in an axial direction of the motor to be decreased, although it leads to an increase in dimension in a radial direction thereof. Also, application of such arrangement to the biaxial motor permits a reduction in dimension thereof in an axial direction thereof as compared with the prior art.

In a preferred embodiment of the present invention, the motor section is arranged outwardly in the radial direction with respect to the rotational position detecting sensor. This leads to an increase in dimension of the stator and rotor of the motor section in the radial direction thereof, to thereby permit an increase in the number of magnetic poles on the stator side and the number of turns of windings wound on the magnetic poles, resulting in increasing torque of the motor section. Also, it facilitates outward dissipation of heat from the motor section, to thereby further increase torque, leading to an increase in amount of a current fed.

When a biaxial motor is to be provided including two rotational position detecting sensor-equipped motors which each include a motor section including a motor stator and a motor rotor, a revolving shaft to which the motor rotor is coupled, a bearing structure for rotatably supporting the revolving shaft, and a rotational position detecting sensor for detecting a rotational position of the revolving shaft and which are combined with each other so as to permit the revolving shafts to be concentric with each other; the rotational position detecting sensor-equipped motor of the present invention constructed as described above may be applied to at least one of two such rotational position detecting sensor-equipped motors. In this instance, at least one of the rotational position detecting sensor-equipped motors are so constructed that the bearing structure, revolving shaft, motor section and rotational position detecting sensor may be arranged so as to be concentric with each other in a radial direction of the revolving shaft. Such construction permits a reduction in dimension of the biaxial motor in the axial direction as compared with the prior art. In particular, application of the construction of the present invention to both rotational position detecting sensor-equipped motors of the biaxial motor permits a reduction in axial direction of the biaxial motor to be maximized.

When two such revolving shafts are to be arranged concentrically with each other to take out an output thereof in the axial direction, the bearing structure of one of the rotational position detecting sensor-equipped motors may be arranged between the revolving shafts arranged concentrically with each other, to thereby permit rotation of the revolving shafts. Also, the bearing structure of the other rotational position detecting sensor-equipped motor may be arranged between one of the revolving shafts which is inwardly arranged and a cylindrical bearing bushing arranged concentrically with the one revolving shaft and fixed on a motor frame. Such construction ensures positive rotatable support of the revolving shafts while reducing the number of parts for the motor.

Also, in accordance with the present invention, a biaxial motor is provided. The biaxial motor includes a first rotational position detecting sensor-equipped motor including a motor section including a first motor stator and a first motor rotor, a first revolving shaft to which the first motor rotor is coupled, a first bearing structure for rotatably supporting the first revolving shaft, and a first rotational position detecting sensor for detecting a rotational position of the first revolving shaft. Also, the biaxial motor includes a second rotational position detecting sensor-equipped motor including a motor section including a second motor stator and a second motor rotor, a second revolving shaft to which the second motor rotor is coupled, a second bearing structure for rotatably supporting the second revolving shaft, and a second rotational position detecting sensor for detecting a rotational position of the second revolving shaft. The first and second revolving shafts are arranged concentrically with each other so that the first revolving shaft is positioned outside the second revolving shaft and the first and second revolving shafts are rotated about a common central line. The biaxial motor further includes a motor frame including first and second side walls positioned on either side of the central line and a peripheral wall positioned between the first side wall and the second side wall and arranged concentrically with the central line. The first bearing structure is disposed between the first revolving shaft and the second revolving shaft. The second revolving shaft includes a revolving shaft body arranged so as to project from the first revolving shaft toward one side in an axial direction thereof. The biaxial motor also includes a bearing bushing arranged outside the revolving shaft body so as to be concentric with the second revolving shaft and fixed on the motor frame. The second bearing structure is arranged between the second revolving shaft and the bearing bushing. In addition, the biaxial motor includes a first rotation frame which is fixed on the first revolving shaft and to which the first motor rotor and a first sensor rotor of the first rotational position detecting sensor are fixed, and a second rotation frame which is fixed on a portion of the second revolving shaft positioned between the first bearing structure and the second bearing structure and to which the second motor rotor and a second sensor rotor of the second rotational position detecting sensor are fixed. The first rotation frame includes two mounted portions which are arranged so as to extend toward the first side wall of the motor frame and be spaced from each other outwardly in the radial direction and on which the first motor rotor and first sensor rotor are respectively mounted. The second rotation frame includes two mounted portions which are arranged so as to extend toward the second side wall of the motor frame and be spaced from each other outwardly in the radial direction and on which the second motor rotor and second sensor rotor are respectively mounted. The first side wall of the motor frame has a first sensor stator which corresponds to the first sensor rotor fixed thereon. The second side wall of the motor frame has a second sensor stator which corresponds to the second sensor rotor fixed thereon. The peripheral wall of the motor frame has the first and second motor stators which correspond to the first and second motor rotors fixed thereon. Such construction permits the motor rotor and sensor rotor to be supported by means of the first and second rotation frames while reducing a dimension of the motor in the axial direction.

In a preferred embodiment of the present invention, the first and second sensor stators are fixed on the first and second side walls, respectively, so that an angular position thereof with respect to the motor section may be externally adjusted. This facilitates assembling of the motor.

Further, in accordance with the present invention, a biaxial motor is provided. The axial motor includes a motor frame including first and second side walls fixed on both sides in an axial direction of a fixing shaft, and a first revolving shaft and a second revolving shaft positioned between the first side wall and the second side wall and arranged concentrically with the fixing shaft through a first bearing structure and a second bearing structure. The first and second revolving shafts are arranged so as to be aligned with each other in the axial direction of the fixing shaft. The biaxial motor also includes first and second rotation frames fixed on said first and second rotation shafts, respectively, a first rotational position detecting sensor including a first sensor rotor provided on one of the first revolving shaft and first rotation frame and a first sensor stator arranged on the first side wall so as to correspond to the first sensor rotor and functioning to detect a rotational position of the first revolving shaft, a first motor section including a first motor rotor provided on the other of the first revolving shaft and first rotation frame and a first motor stator provided on the first side wall so as to correspond to the first rotor and functioning to apply rotational force to the first revolving shaft, a second rotational position detecting sensor including a second sensor rotor provided on one of the second motor revolving shaft and rotation frame and a second sensor stator provided on the second side wall so as to correspond to the sensor rotor and functioning to detect a rotational position of the second revolving shaft, and a second motor section including a second motor rotor provided on the other of the second revolving shaft and second rotation frame and a second motor stator provided on the second side wall so as to correspond to the second motor rotor and functioning to apply rotational force to the second revolving shaft.

The first bearing structure, the first revolving shaft, one of the first rotational position detecting sensor and first motor section, and the other of the first rotational position detecting sensor and first motor are arranged so as to be aligned with each other outwardly in a radial direction of the fixing shaft, resulting in constituting a first rotational position detecting sensor-equipped motor. The second bearing structure, the second revolving shaft, one of the second rotational position detecting sensor and second motor section, and the other of the second rotational position detecting sensor and second motor are arranged so as to be aligned with each other outwardly in the radial direction of the fixing shaft, resulting in constituting a second rotational position detecting sensor-equipped motor.

The axial motor further includes a first output plate arranged so as to extend outwardly in a radial direction of the first revolving shaft from a space defined between the first rotational position detecting sensor-equipped motor and the second rotational position detecting sensor-equipped motor. The first output plate is fixed on the first revolving shaft of the first rotational position detecting sensor-equipped motor and the first rotation frame, to thereby be rotated with the first revolving shaft. In addition, the axial motor includes a second output plate arranged so as to extend outwardly in a radial direction of the second revolving shaft from the space. The second output plate is fixed on the second revolving shaft of the second rotational position detecting sensor-equipped motor and the second rotation frame, to thereby be rotated with the second revolving shaft. Such construction permits a rotational output of the two revolving shafts to be outputted from the first and second rotational position detecting sensor-equipped motors through the first and second output plates while reducing the number of parts therefor and a dimension of the axial motor in the axial direction thereof.

In a preferred embodiment of the present invention, the first and second rotational position detecting sensor-equipped motors are so constructed that the first and second rotational position detecting sensors are positioned inwardly of the first and second motor sections. The second rotational position detecting sensor of the second rotational position detecting sensor-equipped motor is arranged in proximity to the second side wall rather than the second motor section so as to define the space. Such formation of the space ensures arrangement of the first and second rotation frames without significantly increasing a dimension of the biaxial motor in the axial direction.

Also, in a preferred embodiment of the present invention, the first sensor rotor is mounted on the first revolving shaft and the first motor rotor is mounted on the first rotation frame. The second sensor rotor is mounted on the second revolving shaft and the second motor rotor is mounted on the second rotation frame. The first sensor stator and first motor stator are mounted on the first side wall. The second sensor stator and second motor stator are mounted on the second side wall. The first and second sensor stators are mounted on the first and second side walls so that adjustment thereof may be carried out externally in the axial direction of the fixing shaft. Such construction permits an angular position of the first and second sensor stators to be carried out externally in a peripheral direction of the fixing shaft.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described with reference to the accompanying drawings.

Figure 1:
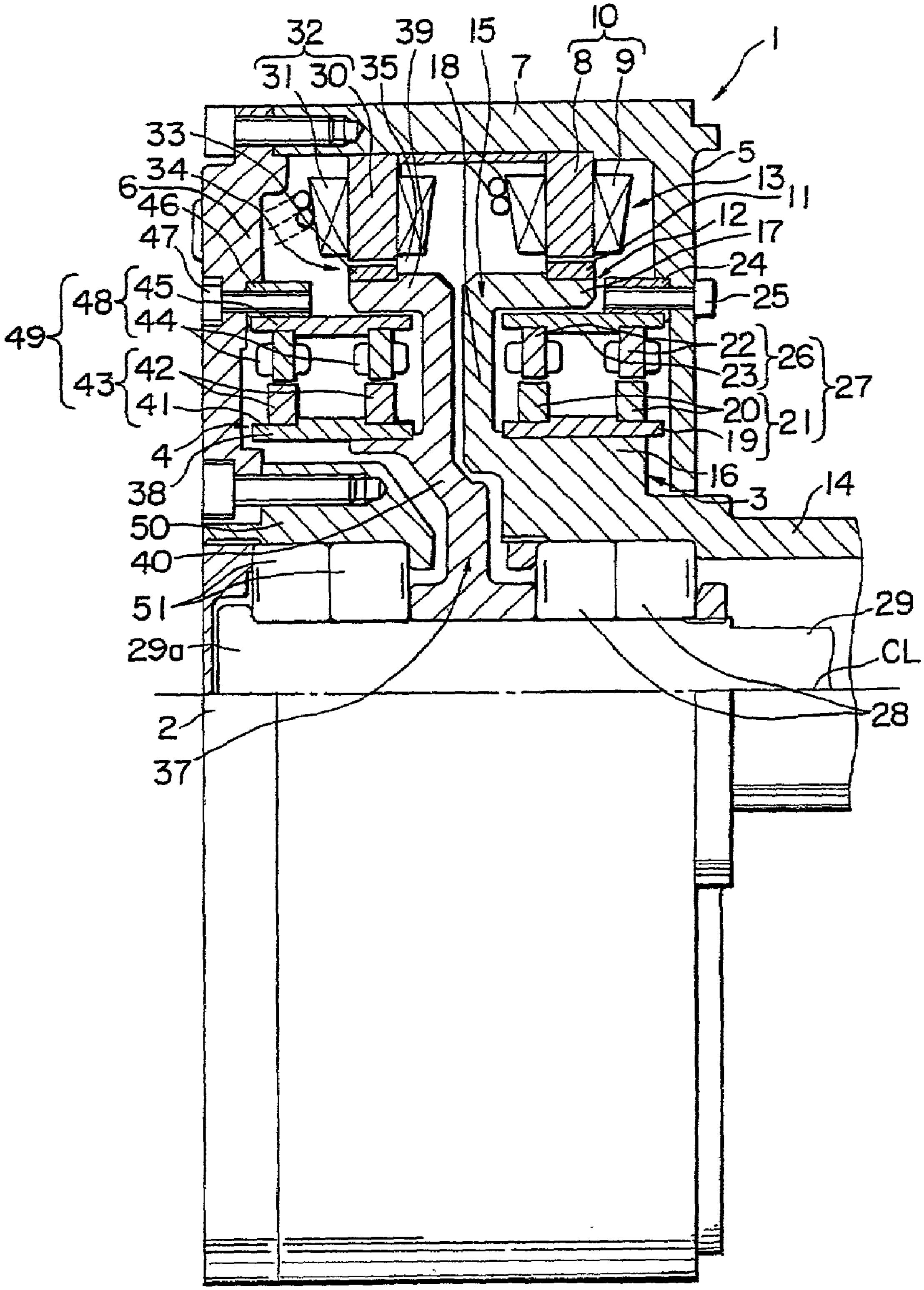
FIG. 1 is a partially sectional view showing an embodiment of a biaxial motor according to the present invention.

Referring first to FIG. 1, an embodiment of a biaxial motor according to the present invention is illustrated, which is constructed so as to permit an output of each of revolving shafts of two rotational position detecting sensor-equipped motors to be taken out in an axial direction thereof. A biaxial motor of the illustrated embodiment which is generally designated at reference numeral 1 generally includes a single motor frame 2, and first and second rotational position detecting sensors 3 and 4 arranged in the single motor frame 2. The motor frame 2 includes a first side wall 5 and a second side wall 6 disposed on both sides of a central line CL of the biaxial motor 1, as well as a peripheral wall arranged coaxially with the central line CL and functioning to connect the side walls 5 and 6 to each other therethrough.

The first rotational position detecting sensor-equipped motor 3 includes a motor section 13 constituted by a first motor stator 10 and a first motor rotor 12. The motor stator 10 includes a stator core 8 having a plurality of silent poles provided on an inner periphery thereof and a winding section 9 having windings wound on the silent poles of the stator core 8 and is fixed on the peripheral wall 7 of the motor frame 2. The first motor rotor 12 includes a plurality of permanent magnets 11. The first motor rotor 12 is fixed on a first rotation frame 15, which is integrally provided on a first revolving shaft 14, resulting in being fixed on the first revolving shaft 14. The first revolving shaft 14 is configured into a hollow structure. More particularly, the first revolving frame 15 includes a first mounted portion 16 and a second mounted portion 17 which are arranged so as to extend toward the first side wall 5 of the motor frame 2 and be spaced from each other at a predetermined interval outwardly in a radiation direction thereof. The first mounted portion 16 is formed so as to be integral with the first revolving shaft 14 and into a cylindrical shape. The second mounted portion 17 is formed into a cylindrical shape and arranged so as to extend from a radially outer end of an annular plate 18 toward the first side wall 5 and in parallel to the central line CL. The annular plate 18 is disposed so as to extend radially outwardly from one end of the first mounted portion 16. The permanent magnets each are jointed to an outer periphery of the second mounted portion 17 by means of an adhesive. In the illustrated embodiment, the first motor rotor 12 is constituted by the first rotation frame 15 and permanent magnets 11.

The first mounted portion 16 of the first rotation frame 15 has a cylindrical yoke 19 fixedly fitted on an outer peripheral surface thereof, and the yoke 19 is fixedly mounted on an outside thereof with two resolver rotators 20, which are arranged so as to be spaced from each other in the axial direction. The yoke 19 and two such resolver rotors 20 cooperate with each other to constitute a first sensor rotor 21. A space is defined outwardly in a radial direction of the first sensor rotor 21 and inwardly of the second mounted portion 17. The space has two resolver stators 22 arranged therein in a manner to be radially opposite to the resolver rotors 20. The resolver stators 22 are fixedly arranged on an inner peripheral surface of a cylindrical yoke 23 in a manner to be spaced from each other in the axial direction. The yoke 23 is mounted on the first side wall 5 of the motor frame 2 by means of a fixing member 24 and a screw 25 so that an angular position thereof with respect to the motor section 13 may be adjusted. The fixing member 24 is formed with a female thread with which a male thread of the screw 25 is threadedly engaged. The first side wall 5 is formed with an elongated hole so as to extend in an arcuate configuration in a peripheral direction thereof. The screw 25 is arranged in the elongated hole so that a position of the screw therein may be shifted or varied. A positional variation of the screw 25 in the elongated hole permits an angular position of the resolver stators 22 in relation to the motor section 13 to be varied as desired. In the illustrated embodiment, the yoke 23 and resolver stators 22 cooperate with each other to constitute a first sensor stator 26. The first sensor stator 26 and first sensor rotor 21 cooperate with each other to constitute a first rotational position detecting sensor 27 for detecting a rotational position of the first revolving shaft 1.

The first revolving shaft 14 is provided therein with a first bearing structure for rotatably supporting the first revolving shaft 14. For this purpose, the first bearing structure is constituted by two ball bearings 28. The ball bearings 28 each have an outer ring fixed in the first revolving shaft 14 and an inner ring fixedly fitted on a revolving shaft of the second rotational position detecting sensor-equipped motor 4 or a second revolving shaft 29.

The second rotational position detecting sensor-equipped motor 4 is arranged so as to be aligned with the first rotational position detecting sensor-equipped motor 3 in the axial direction. The second rotational position detecting sensor-equipped motor 4 includes a second motor section 35 constituted by a second motor stator 32 and a second motor rotor 34. The second motor stator 32 includes a stator core 30 having a plurality of silent poles provided on an inner periphery thereof and a winding section 31 including windings wound on the silent poles of the stator core 30 and is fixed on the peripheral wall 7 of the motor frame 2. The second motor rotor 34 includes a plurality of permanent magnets 33. The second motor rotor 34 is fixed on a second rotation frame 37 fixed on the second revolving shaft 29. More particularly, the second revolving frame 37 includes a first mounted portion 38 and a second mounted portion 39 which are arranged so as to extend toward the second side wall 6 of the motor frame 2 and be spaced from each other at a predetermined interval outwardly in a radiation direction thereof. The first mounted portion 38 is formed so as to be integral with an annular plate 40 fixed on the second revolving so as to extend in the radial direction. Also, the first mounted portion 38 is formed into a cylindrical configuration and arranged so as to extend in parallel to the central line CL and toward the second side wall 6 from an intermediate portion of the annular plate 40. The second mounted portion 39 is formed into a cylindrical shape and arranged so as to extend from a radially outer end of the annular plate 40 toward the second side wall 6 and in parallel to the central line CL. The permanent magnets 33 each are jointed to an outer periphery of the second mounted portion 39 by means of an adhesive. In the illustrated embodiment, the second motor rotor 34 is constituted by the second rotation frame 37 and permanent magnets 33.

The first mounted portion 38 of the second rotation frame 37 has a cylindrical yoke 41 fitted on an outer peripheral surface thereof, and the yoke 41 is fixedly mounted on an outside thereof with two resolver rotator 42, which are arranged so as to be spaced from each other in the axial direction. The yoke 41 and two such resolver rotors 42 cooperate with each other to constitute a second sensor rotor 43. A space is defined outwardly in a radial direction of the second sensor rotor and inwardly of the second mounted portion 39. The space is provided therein with two resolver stators 44 in a manner to be radially opposite to the resolver rotors 42. The resolver stators 44 are fixedly arranged on an inner peripheral surface of a cylindrical yoke 45 in a manner to be spaced from each other in the axial direction. The yoke 45 is mounted on the second side wall 6 of the motor frame 2 by means of a fixing member 46 and a screw 47 so that an angular position thereof with respect to the second motor section 35 may be adjusted. The second side wall 6 is likewise formed with an elongated hole so as to extend in an arcuate configuration in a peripheral direction thereof. In the illustrated embodiment, the yoke 45 and resolver stators 44 cooperate with each other to constitute a second sensor stator 48. The second sensor stator 48 and the above-described second sensor rotor 43 cooperate with each other to constitute a second rotational position detecting sensor 49 for detecting a rotational position of the second revolving shaft 29.

The second revolving shaft 29 includes a revolving shaft body **29*a* arranged so as to project from the first revolving shaft 14 toward one side in the axial direction thereof. The revolving shaft body 29*a* has a cylindrical bearing bushing 50 arranged thereon coaxially with the second revolving shaft 29. The bearing bushing 50 is fixed on the second side wall 6 of the motor frame 2. Also, two ball bearings 51 are arranged between the revolving shaft body 29*a* of the second revolving shaft 29 and the bearing bushing 50. The ball bearings 51** constitute a second bearing structure.

The first and second rotational position detecting sensor-equipped motors 3 and 4 in the illustrated embodiment are so arranged that the bearing structures 28 and 51, revolving shafts 14 and 29, motor sections 13 and 35, and rotational position detecting sensor 27 and 49 are arranged coaxially with each other in the radial direction of the revolving shafts 14 and 29. Although such arrangement causes the biaxial motor 1 to be increased in dimension thereof in the radial direction thereof, it permits a dimension of the biaxial motor 1 in the axial direction to be significantly reduced as compared with the prior art. When such arrangement is applied to any one of the rotational position detecting sensor-equipped motors as well, the biaxial motor likewise may be reduced in dimension thereof in the axial direction as compared with the prior art.

In particular, arrangement of the motor sections 13 and 35 on an outside of the rotational position detecting sensor 27 and 49 in the illustrated embodiment leads to an increase in dimension of the stators and rotors of the motor sections 13 and 35 in the radiation direction, to thereby increase the number of magnetic poles on a side of the stators and the number of turns of the windings wound on the magnetic poles, resulting in an increase in torque of the motor. Also, it facilitates outward dissipation of heat from the motor sections 13 and 35, to thereby permit feed of a current in a large amount, resulting in a further increase in torque.

Figure 2:
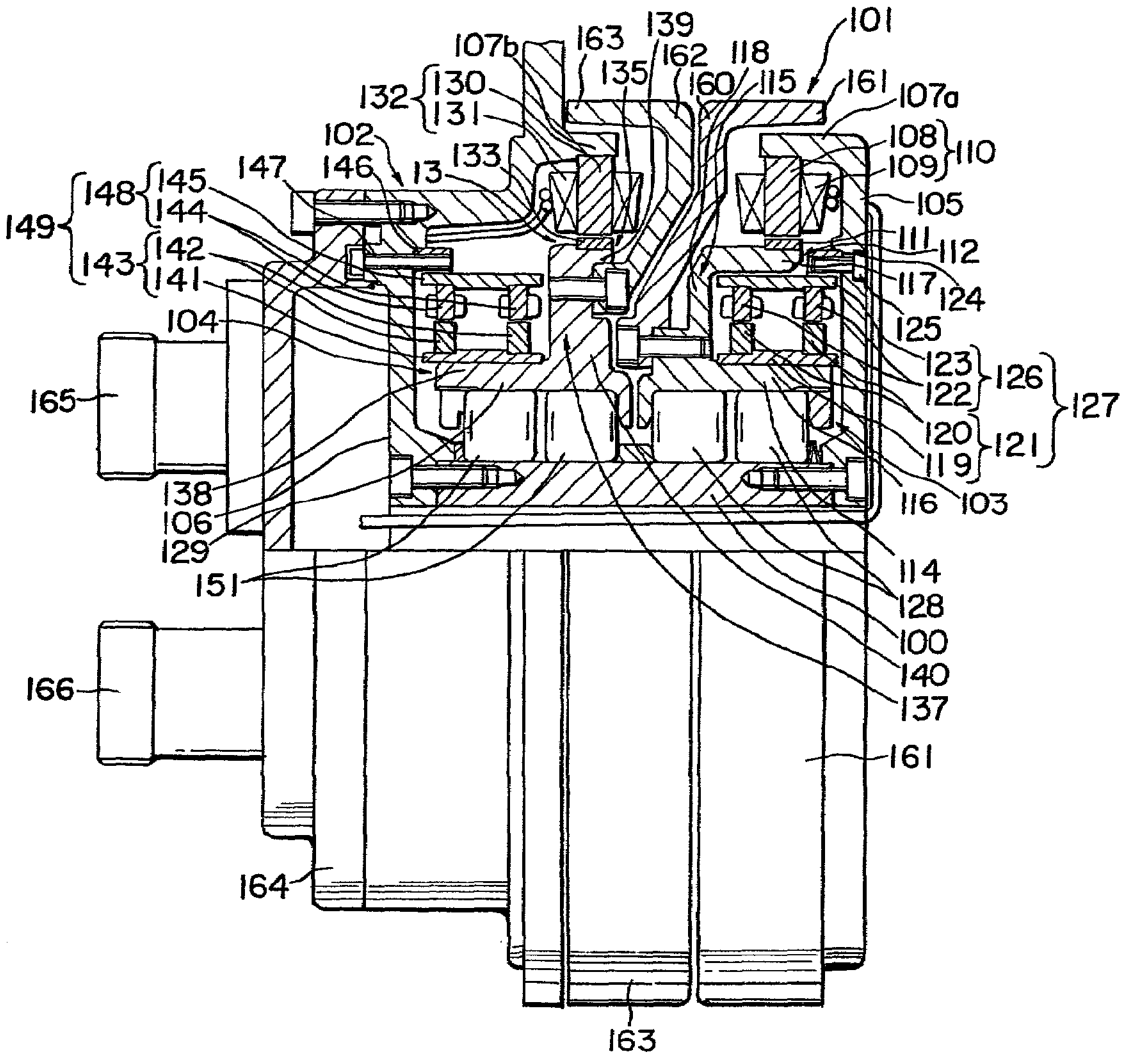
FIG. 2 is a partially sectional view showing another embodiment of a biaxial motor according to the present invention.

Referring now to FIG. 2, another embodiment of a biaxial motor according to the present invention is illustrated, which is adapted to take out an output of each of two revolving shafts outwardly in a radial direction of the revolving shafts. In connection with the illustrated embodiment, reference numerals correspond to those discussed in the embodiment described above, except with an additional prefix of 100, and therefore will not be more fully described. A biaxial motor of the illustrated embodiment generally designated by reference numeral 101 includes a motor frame 102 including a first side wall 105 and a second side wall 106 fixed on both sides in an axial direction of a hollow fixing shaft 100. The first side wall 105 and second side wall 106 are provided on an end thereof positioned outwardly in a radial direction thereof with partial peripheral wall portions **107*a* and 107*b* so as to extend in the axial direction of the fixing shaft 100**, respectively.

A first rotational position detecting sensor-equipped motor 103 includes a motor section 113. The motor section 113 is constituted by a first motor stator 110 and a first motor rotor 112 including a plurality of permanent magnets 111. The first motor stator 110 includes a stator core 108 and a winding section 109 having windings wound on silent poles of the stator core 108. The first motor stator 110 is fixedly mounted on the partial peripheral wall portion **107*a*. The first motor stator 112 is fixed on a first rotation frame 115, which is integrally provided on a hollow first revolving shaft 114, resulting in being fixed thereon. The first rotation frame 115 includes a first mounted portion 116 and a second mounted portion 117, which are arranged so as to extend toward the first side wall 105 of the motor frame 102 and be spaced from each other outwardly in a radial direction thereof. The first mounted portion 116 is provided so as to be integral with the first revolving shaft 114 and formed into a cylindrical shape. The second mounted portion 117 is formed into a cylindrical shape and arranged so as to extend in parallel to an axis of the fixing shaft 100 and toward the first side wall 105 from an outer end of an annular plate 118 defined in a radiation direction thereof. The annular plate 118 is arranged so as to extend outwardly in the radial direction from one end of the first mounted portion 116. In the illustrated embodiment, the first motor rotor 112 is constituted by the first rotation frame 115 and permanent magnets 111**.

The first mounted portion 116 of the first rotation frame 115 has a yoke 119 fixedly fitted thereon, which is mounted on an outside thereof with two resolver rotors 120 in a manner to be spaced from each other in the axial direction. The yoke 119 and two such resolver rotors 120 cooperate with each other to constitute a first sensor rotor 121. A space is defined outwardly in a radial direction of the first sensor rotor 121 and inwardly of the second mounted portion 117. The space is provided therein with two resolver stators 122 in a manner to be opposite to the resolver rotors 120 in the radiation direction while being fixed on an inner peripheral surface of a cylindrical yoke 123 in a manner to be spaced from each other in the axial direction. The yoke 123 is fixedly mounted on the first side wall 105 of the motor frame 102 by means of a fixing member 124 and a screw 125 so that an angular position thereof with respect to the motor section 113 may be adjusted. The first side wall 105 is formed with an arcuate elongated hole for adjustment of the angular position. In the illustrated embodiment, the yoke 123 and two such solver stators 122 cooperate with each other to constitute a first sensor stator 126. The thus-constituted first sensor stator 126 and first sensor rotors 121 described above cooperate with each other to constitute a first rotational position detecting sensor 127 for detecting a rotational position of the first revolving shaft 114.

The first rotation plate 115 is mounted thereon with a first output plate 160 rotated with the first revolving shaft 114. The first output shaft 160 is arranged so as to extend outwardly in a radial direction of the first revolving shaft 114. Also, the first output shaft 160 has a first annular mounting plate 161 integrally mounted on an outer end thereof. The first annular mounting plate 161 is arranged in a manner to be coaxial with the first revolving shaft 114 and extend toward the first side wall 105.

The first revolving shaft 114 is provided therein with a first bearing structure constituted by two ball bearings 128 for rotatably supporting the first revolving shaft 114. The ball bearings 128 each have an outer ring fixed in the first revolving shaft 114 and an inner ring fixed on the fixing shaft 100.

The second rotational position detecting sensor-equipped motor 104 is arranged in a manner to be aligned with the first rotational position detecting sensor-equipped motor 103 in the axial direction. The second rotational position detecting sensor-equipped motor 104 includes a second motor section 135. The second motor section 135 is constituted by a second motor stator 132 and a second motor rotor 134. The second motor stator 132 includes a stator core 130 and a winding section 131 and is mounted on the partial peripheral wall portion 107*b*. The second motor rotor 134 includes a plurality of permanent magnets 133. The second motor rotor

134 is fixedly mounted on a second rotation frame 137 fixed on a second revolving shaft 129. More particularly, the second rotation frame 137 includes a first mounted portion 138 and a second mounted portion 139 which are arranged so as to extend toward the second wall 106 of the motor frame 102 and be spaced from each other outwardly in the radiation direction. The first mounted portion 138 is formed so as to be integral with an annular plate 140, which is integrally formed on the second revolving shaft 129 and arranged so as to extend in the radial direction. Also, the second mounted portion 139 is formed into a cylindrical shape and disposed so as to extend from an outer end of the annular plate 140 defined in a radial direction thereof toward the first side wall 105 and in parallel to an axis of the fixing shaft 100. In the illustrated embodiment, the second motor rotor 134 is constituted by the second rotation frame 137 and permanent magnets 133.

The first mounted portion 138 of the second rotation frame 137 has a cylindrical yoke 141 fixedly fitted on an outer peripheral surface thereof. The yoke 141 is fixedly mounted on an outside thereof with two resolver rotors 142 in a manner to be spaced from each other in the axial direction. The yoke 141 and two such resolver rotors 142 cooperate with each other to constitute a second sensor rotor 143. A spacer is defined outwardly in the radial direction of the second sensor rotor 143 and inwardly of the second mounted portion 139. The space is provided therein with two resolver stators 144 in a manner to be opposite to the resolver rotors 142 in the radial direction while being spaced from each other in the axial direction and fixed on an inner peripheral surface of a cylindrical yoke 145. The yoke 145 is fixedly mounted on the second side wall 106 of the motor frame 102 by means of a fixing member 146 and a screw 147 so that an angular position thereof may be adjusted. Also, the second side wall 106 is formed with an elongated hole for adjustment of the angular position. In the illustrated embodiment, the yoke 145 and two such resolver stators 144 cooperate with each other to constitute a second sensor stator 148. In addition, the thus-constituted second sensor stator 148 and second sensor rotor 143 described above cooperate together to constitute a second rotational position detecting sensor 149 for detecting a rotational position of the second revolving shaft 129.

The second rotation plate 140 is fixedly mounted thereof with a second output plate 162 rotated with the second revolving shaft 129. The second output plate 162 is disposed so as to extend outwardly in the radial direction of the second revolving shaft 129 and has a second annular mounting plate 163 integrally provided on an outer end thereof. The second annular mounting plate 163 is arranged concentrically with the second revolving shaft 129 and so as to extend toward the second side wall 106. Also, two ball bearings 151 are disposed between the second revolving shaft 129 and fixing shaft 100. The ball bearings 151 constitute a second bearing structure.

In the illustrated embodiment, the first rotational position detecting sensor-equipped motor 103 is arranged concentrically with the bearing structure 128, revolving shaft 114, motor section 113 and rotational position detecting sensor 127 in the radial direction of the revolving shaft 114. Also, the second rotational position detecting sensor-equipped motor 104 is so arranged that the second rotational position detecting sensor 149 is deviated outwardly in the axial direction from the second motor section 135.

Also, in the illustrated embodiment, the second side wall 106 has a cover member 164 fixed thereon. The cover member 164 has output connectors 165 and 166 for the first and second rotational position detecting sensors 127 and 149 mounted thereon.

Further, as noted from the above, the illustrated embodiment is constructed so as to permit a rotational output of the revolving shafts 114 and 129 to be outputted from the space between the first rotational position detecting sensor-equipped motor 103 and the second rotational position detecting sensor-equipped motor 104 through the first and second output plates 160 and 162 while decreasing the number of parts for the biaxial motor 101 and reducing a dimension thereof in the axial direction thereof.

In particular, the first output plate 160 is provided on the outer end thereof with the first annular mounting plate 161 so as to be concentric with the first revolving shaft 114 and the second output plate 162 is provided on the outer end thereof with the second annular mounting plate 163 so as to be concentric with the second revolving shaft 129. Also, the first annular mounting plate 161 and second annular mounting plate 163 are arranged in a manner to be spaced from each other in the axial direction, to thereby be kept from overlapping with each other. Such constriction permits dimensions of the first annular mounting plate 161 and second annular mounting plate 163 to be set as desired to some extent, to thereby facilitating mounting of a load on the first and second annular mounting plates 161 and 162.

As can be seen form the foregoing, the rotational position detecting sensor-equipped motor of the present invention permits a dimension of the motor in the axial direction to be reduced as compared with the prior art although it causes a dimension thereof in the radial direction to be somewhat increased. Also, application of the present invention to at least one of the rotational position detecting sensor-equipped motors constituting the biaxial motor leads to a reduction in a dimension of the biaxial motor in the axial direction thereof as compared with the prior art.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A biaxial motor comprising:

a first rotational position detecting sensor-equipped motor including a motor section including a first motor stator and a first motor rotor, a first revolving shaft to which said first motor rotor is coupled, a first bearing structure for rotatably supporting said first revolving shaft, and a first rotational position detecting sensor for detecting a rotational position of said first revolving shaft;

a second rotational position detecting sensor-equipped motor including a motor section including a second motor stator and a second motor rotor, a second revolving shaft to which said second motor rotor is coupled, a second bearing structure for rotatably supporting said second revolving shaft, and a second rotational position detecting sensor for detecting a rotational position of said second revolving shaft;

said first and second revolving shafts being arranged concentrically with each other so that said first revolving shaft is positioned outside said second revolving shaft and said first and second revolving shafts are rotated about a common central line;

a motor frame including first and second side walls positioned on either side of said central line and a peripheral wall positioned between said first side wall and said second side wall and arranged concentrically with said central line;

said first bearing structure being disposed between said first revolving shaft and said second revolving shaft;

said second revolving shaft including a revolving shaft body arranged so as to project from said first revolving shaft toward one side in an axial direction thereof;

a bearing bushing arranged outside said revolving shaft body so as to be concentric with said second revolving shaft and fixed on said motor frame;

said second bearing structure being arranged between said second revolving shaft and said bearing bushing;

a first rotation frame which is fixed on said first revolving shaft and to which said first motor rotor and a first sensor rotor of said first rotational position detecting sensor are fixed; and a second rotation frame which is fixed on a portion of said second revolving shaft positioned between said first bearing structure and said second bearing structure and to which said second motor rotor and a second sensor rotor of said second rotational position detecting sensor are fixed;

said first rotation frame including two mounted portions which are arranged so as to extend toward said first side wall of said motor frame and be spaced from each other outwardly in said radial direction and on which said first motor rotor and first sensor rotor are respectively mounted;

said second rotation frame including two mounted portions which are arranged so as to extend toward said second side wall of said motor frame and be spaced from each other outwardly in said radial direction and on which said second motor rotor and second sensor rotor are respectively mounted;

said first side wall of said motor frame having a first sensor stator which corresponds to said first sensor rotor fixed thereon;

said second side wall of said motor frame having a second sensor stator which corresponds to said second sensor rotor fixed thereon;

said peripheral wall of said motor frame having said first and second motor stators which correspond to said first and second motor rotors fixed thereon.

2. A biaxial motor as defined in claim 1, wherein said first and second sensor stators are fixed on said first and second side walls, respectively, so that an angular position thereof with respect to said motor section may be externally adjusted.

3. A biaxial motor comprising:

a motor frame including first and second side walls fixed on both sides in an axial direction of a fixing shaft (100);

a first revolving shaft (114) and a second revolving shaft (129) positioned between said first side wall (105) and said second side wall (106) and arranged concentrically with said fixing shaft (100) through a first bearing structure and a second bearing structure;

said first and second revolving shafts being arranged so as to be aligned with each other in the axial direction of said fixing shaft;

first and second rotation frames fixed on said first and second revolving shafts, respectively;

a first rotational position detecting sensor including a first sensor rotor provided on one of said first revolving shaft and first rotation frame and a first sensor stator arranged on said first side wall so as to correspond to said first sensor rotor and functioning to detect a rotational position of said first revolving shaft;

a first motor section including a first motor rotor provided on the other of said first revolving shaft and first rotation frame and a first motor stator provided on said first side wall so as to correspond to said first rotor and functioning to apply rotational force to said first revolving shaft;

a second rotational position detecting sensor including a second sensor rotor provided on one of said second motor revolving shaft and rotation frame and a second sensor stator provided on said second side wall so as to correspond to said sensor rotor and functioning to detect a rotational position of said second revolving shaft;

a second motor section including a second motor rotor provided on the other of said second revolving shaft and second rotation frame and a second motor stator provided on said second side wall so as to correspond to said second motor rotor and functioning to apply rotational force to said second revolving shaft;

said first bearing structure, said first revolving shaft, one of said first rotational position detecting sensor and first motor section, and the other of said first rotational position detecting sensor and first motor being arranged so as to be aligned with each other outwardly in a radial direction of said fixing shaft, resulting in constituting a first rotational position detecting sensor-equipped motor;

said second bearing structure, said second revolving shaft, one of said second rotational position detecting sensor and second motor section, and the other of said second rotational position detecting sensor and second motor being arranged so as to be aligned with each other outwardly in said radial direction of said fixing shaft, resulting in constituting a second rotational position detecting sensor-equipped motor;

a first output plate arranged so as to extend outwardly in a radial direction of said first revolving shaft from a space defined between said first rotational position detecting sensor-equipped motor and said second rotational position detecting sensor-equipped motor;

said first output plate being fixed on said first revolving shaft of said first rotational position detecting sensor-equipped motor and said first rotation frame, to thereby be rotated with said first revolving shaft; and a second output plate arranged so as to extend outwardly in a radial direction of said second revolving shaft from said space;

said second output plate being fixed on said second revolving shaft of said second rotational position detecting sensor-equipped motor and said second rotation frame, to thereby be rotated with said second revolving shaft.

4. A biaxial motor as defined in claim 3, wherein said first and second rotational position detecting sensor-equipped motors are so constructed that said first and second rotational position detecting sensors are positioned inwardly of said first and second motor sections; and said second rotational position detecting sensor of said second rotational position detecting sensor-equipped motor is arranged in proximity to said second side wall rather than said second motor section so as to define said space.

5. A biaxial motor as defined in claim 4, wherein said first sensor rotor is mounted on said first revolving shaft and said first motor rotor is mounted on said first rotation frame;

said second sensor rotor is mounted on said second revolving shaft and said second motor rotor is mounted on said second rotation frame;

said first sensor stator and first motor stator are mounted on said first side wall;

said second sensor stator and second motor stator are mounted on said second side wall; and said first and second sensor stators are mounted on said first and second side walls so that adjustment thereof may be carried out externally in said axial direction of said fixing shaft.

* * * * *